United States Patent [19]
Hughes

[11] Patent Number: 5,772,293
[45] Date of Patent: Jun. 30, 1998

[54] DUST COVER FOR COMPUTER COMPONENTS

[76] Inventor: Renee J. Hughes, 17 14th Ave., San Francisco, Calif. 94118

[21] Appl. No.: 807,589

[22] Filed: Feb. 27, 1997

[51] Int. Cl.[6] .................................................. A47B 81/06
[52] U.S. Cl. ...................... 312/208.3; 312/7.2; 312/223.2
[58] Field of Search ............................ 312/208.3, 223.2, 312/7.2

[56] References Cited

U.S. PATENT DOCUMENTS

| | | | |
|---|---|---|---|
| 1,315,794 | 9/1919 | Richards | 312/208.3 |
| 2,390,987 | 12/1945 | Cabrera | 312/208.3 |
| 2,492,262 | 12/1949 | Boyden et al. | 312/208.3 X |
| 3,802,102 | 4/1974 | Liccardi | 312/7.2 X |
| 4,658,956 | 4/1987 | Takeda et al. | 312/7.2 X |
| 5,429,142 | 7/1995 | Szabo et al. | 128/849 |
| 5,464,214 | 11/1995 | Griffin | 312/7.2 X |
| 5,564,209 | 10/1996 | Zagnoli | 312/7.2 X |

Primary Examiner—Peter M. Cuomo
Assistant Examiner—David E. Allred

[57] ABSTRACT

A dust cover for computer components including a cover member that is adapted for being supported around a computer component. The cover member is formed of a stretch material that is expanded to cover at least four panels of the computer component. The cover member, when covering the computer component, has a top panel, a bottom panel, and a plurality of side panels. Each panel of the cover member has a common and discontinuous rear end edge that defines a slit. The slit is in the bottom panel of the cover member. The cover member is positioned around the computer component and allows the rear edge to frame the computer component when the draw string is pulled tight and tied.

2 Claims, 3 Drawing Sheets

DUST COVER FOR COMPUTER COMPONENTS

BACKGROUND OF THE INVENTION

1. Field of the Invention

The present invention relates to a dust cover for computer components and more particularly pertains to providing a dust cover for protecting computer components such as a monitor, keyboard and CPU casing, and further providing a dust cover that can remain in position while the computer is in use.

2. Description of the Prior Art

The use of a dust cover is known in the prior art. More specifically, dust covers heretofore devised and utilized for the purpose of protecting computer components are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,429,142 to Szabo and Monty discloses a surgical video systems cover. U.S. Pat. No. 5,370,468 to Chern and Cheng discloses a dust cover assembly for computer keyboard. U.S. Pat. No. 5,163,870 to Cooper discloses a protective dust cover for computer components. U.S. Pat. Des. 304,271 to Johnson discloses an audio/video component dust cover. U.S. Pat. No. 4,848,874 to Mui and Tao discloses a video monitor shade. Lastly, U.S. Pat. No. 4,449,763 to Barnett discloses a protective cover for keyboard machines.

While these devices fulfill their respective, particular objectives and requirements, the aforementioned patents do not describe a dust cover for computer components that allows the dust cover to be positioned around the computer component and remain in position while the computer component is being used.

In this respect, the dust cover for computer components according to the present invention substantially departs from the conventional concepts and designs of the prior art, and in doing so provides an apparatus primarily developed for the purpose of providing a dust cover for protecting computer components such as a monitor, keyboard and CPU casing, and further providing a dust cover that can remain in position while the computer components are in use.

Therefore, it can be appreciated that there exists a continuing need for a new and improved dust cover for computer components which can be used for providing a dust cover for protecting computer components such as a monitor, keyboard and CPU casing, and further providing a dust cover that can remain in position while the computer components are in use. In this regard, the present invention substantially fulfills this need.

SUMMARY OF THE INVENTION

In view of the foregoing disadvantages inherent in the known types of dust covers now present in the prior art, the present invention provides an improved dust cover for computer components. As such, the general purpose of the present invention, which will be described subsequently in greater detail, is to provide a new and improved dust cover for computer components and method which has all the advantages of the prior art and none of the disadvantages.

To attain this, the present invention essentially comprises a generally rectangular cover member. The cover member is adapted to be supported around a computer component. The cover member is formed of a stretch material that is expanded to cover at least four panels of the computer component. The cover member has a top panel, a bottom panel, and a pair of side panels. Each panel of the cover member has a common and continuous front end edge that defines an opening. Each panel of the cover member also has a common and discontinuous rear end edge. The rear end edge defines a slit within the bottom panel of the cover member. The front end edge and the rear end edge each have a hem. The hem of the front end edge has a semi-rigid framing member within. The hem of the rear end edge has a draw string within. The cover member is positioned around the computer component and allows the front end edge to frame a screen of the computer component and the slit of the bottom panel is positioned around a pedestal of the computer component. The cover member is positioned around the computer component and allows the rear end edge to frame a back of the computer component when the draw string is pulled tight and tied and the front end edge is framing the screen. The top panel has a generally rectangular ventilation opening. The ventilation opening has peripheral edges which form a front edge, a back edge and a pair of side edges. The top panel also has a flap which is fixedly attached to the back edge of the ventilation opening. The flap is sized to cover the ventilation opening. The flap is capable of rolling back and forth over the ventilation opening to open and close the ventilation opening when the cover member is positioned over the computer component.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dust cover for computer components which has all of the advantages of the prior art dust covers and none of the disadvantages.

It is another object of the present invention to provide a new and improved dust cover for computer components which may be easily and efficiently manufactured and marketed.

It is further object of the present invention to provide a new and improved dust cover for computer components which is of durable and reliable constructions.

An even further object of the present invention is to provide a new and improved dust cover for computer components which is susceptible of a low cost of manufacture with regard to both materials and labor, and which accordingly is then susceptible of low prices of sale to the consuming public, thereby making such dust cover for computer components economically available to the buying public.

Even still another object of the present invention is to provide a dust cover for computer components for providing a dust cover for protecting computer components such as a monitor, keyboard and CPU casing, and further providing a dust cover that can remain in position while the computer is in use.

Lastly, it is an object of the present invention to provide a new and improved dust cover for computer components including a cover member that is adapted for being supported around a computer component. The cover member is formed of a stretch material that is expanded to cover at least four panels of the computer component. The cover member, when covering the computer component, has a top panel, a bottom panel, and a plurality of side panels. Each panel of the cover member has a common and discontinuous rear end edge that defines a slit. The slit is in the bottom panel of the cover member. The cover member is positioned around the computer component and allows the rear edge to frame the computer component when the draw string is pulled tight and tied.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
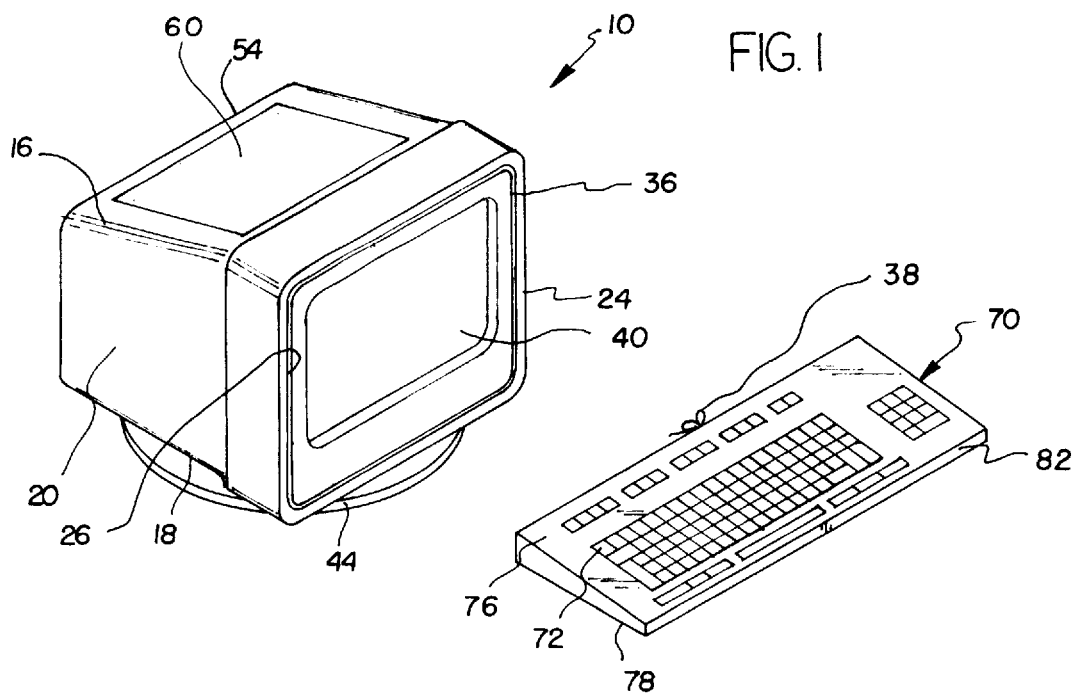
FIG. 1 is a perspective view of the preferred embodiment of the dust cover for computer components constructed in accordance with the principles of the present invention.

With reference now to the drawings, and in particular to FIG. 1 thereof, the preferred embodiment of the new and improved dust cover for computer components embodying the principles and concepts of the present invention and generally designated by the reference numeral 10 will be described.

The present invention, the dust cover for computer components 10 is comprised of a plurality of components. Such components in their broadest context include a cover member, a flap, and a drawstring. Such components are individually configured and correlated with respect to each other so as to attain the desired objective.

Figure 2:
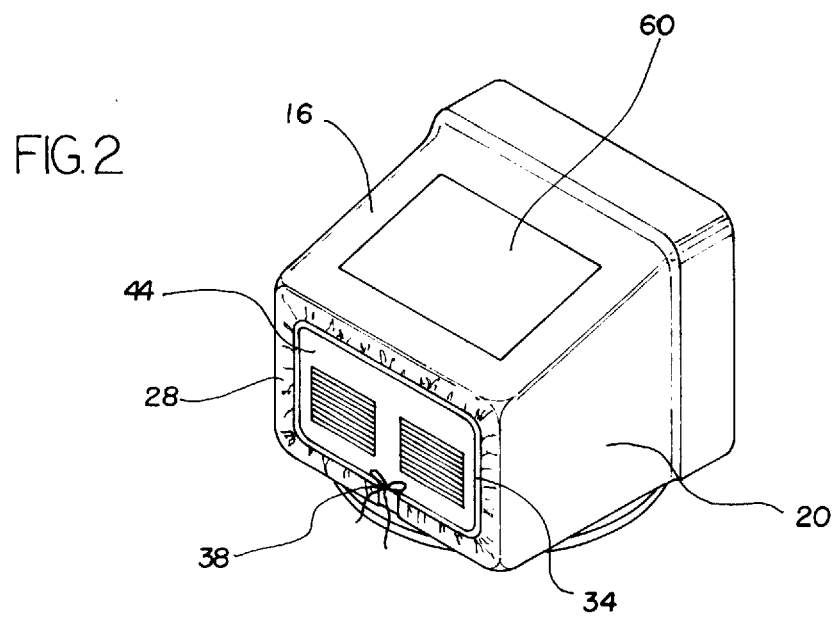
FIG. 2 is a rear isometric view of the present invention in an operable orientation.

Specifically, the present invention includes a generally rectangular cover member 12. The cover member is adapted to be supported around a computer component 14, as shown in FIG. 1. The cover member is formed of a stretch material that is expanded to cover at least four panels of the computer component. Preferably, the material is made from a cotton/lycra blend. The blended fabric will stretch in four ways and will fit snugly around the computer coponent. The cover member, when covering the computer component, has a top panel 16, a bottom panel 18, and a pair of side panels 20. Each panel of the cover member has a common and continuous front end edge 24 that defines an opening 26. Each panel of the cover member also has a common and discontinuous rear end edge 28, as shown in FIG. 2.

Figure 3:
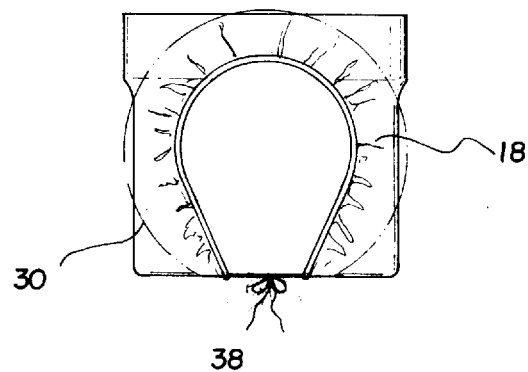
FIG. 3 is a bottom view of the present invention in an operable orientation.
Figure 6:
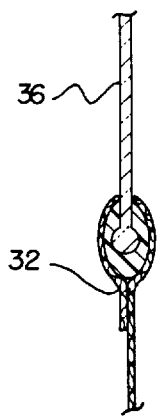
FIG. 6 is a cross-sectional view of the present invention taken along line 6—6 of FIG. 5.

As best illustrated in FIG. 3, the rear end edge defines a slit 30 within the bottom panel 18 of the cover member. The front end edge and the rear end edge each have a hem 32 and 34. The hem 32 of the front end edge has a semi-rigid framing member 36 within. The framing member, as shown in FIG. 6, is plastic and projects from within the hem 32. The hem 34 of the rear end edge has a draw string 38 within. The cover member is positioned around the computer component and allows the front end edge to frame a screen 40 of the computer component.

Also, when the cover member is positioned around the computer component, the slit of the bottom panel is positioned around a pedestal 42 of the computer component. The cover member, when positioned around the computer component, allows the rear end edge to frame a back 44 of the computer component. When the draw string is pulled tight and tied, and the front end edge frames the screen, the cover member is snugly positioned around the computer component and remains in position during use of the computer component.

Figure 4:
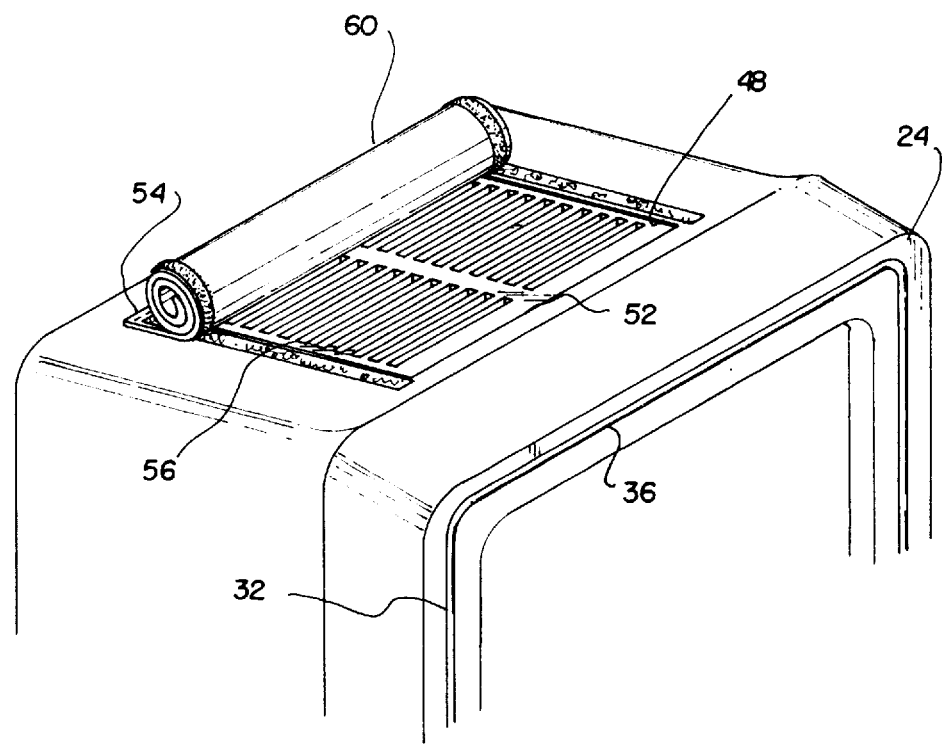
FIG. 4 is a cut-away view of the present invention showing the flap in an operable orientation.
Figure 5:
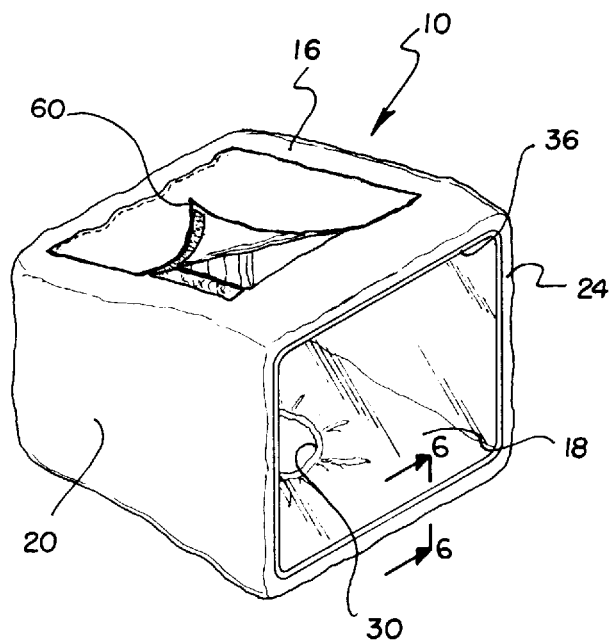
FIG. 5 is an isometric view of the present invention prior to being positioned around the computer component.
Figure 7:
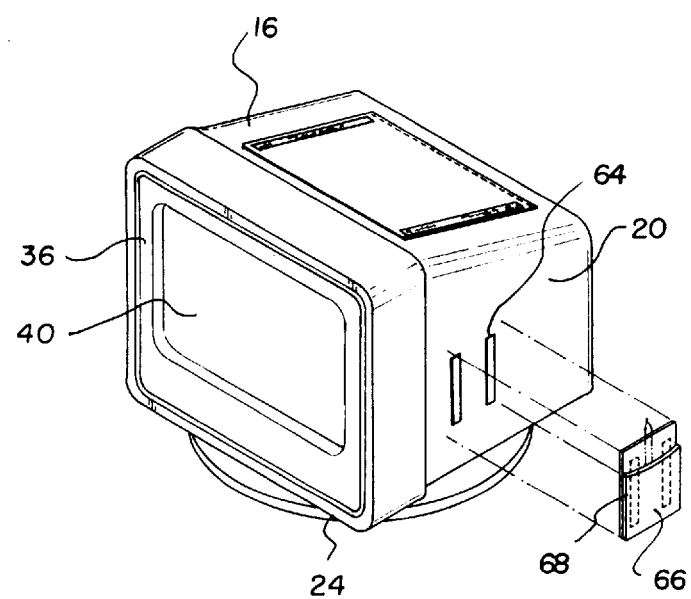
FIG. 7 is an isometric view of the present invention showing the optional side pocket.

Additionally, the top panel 16 of the cover member has a generally rectangular ventilation opening 48. The ventilation opening has peripheral edges which form a front edge 52, a back edge 54 and a pair of side edges 56. The top panel has a flap 60 that is fixedly attached to the back edge of the ventilation opening, as shown in FIG. 5. The flap is sized for covering the ventilation opening. The flap, as depicted in FIG. 4, is capable of rolling back and forth. The flap rolls over the ventilation opening to open and close the ventilation opening when the cover member is positioned over the computer component. Lastly, one of the side panels 20 of the cover member has a pair of pile-type fastener strips 64 fixedly attached. The strips are spaced apart and parallel to each other. The strips, as positioned on the cover member, will receive a side pocket 66. The side pocket has a pair of pile-type fasteners 68 that may be coupled to the pile-type fasteners of the cover member. The side pocket, as shown in FIG. 7, can be used to hold a writing utensil or other items.

Furthermore, an alternative cover member 70 may be adapted for being supported around a computer component other than a monitor. Like the above cover member, the alternative cover member is formed of a stretch material that is capable of expanding to cover at least four panels of the computer component. In FIG. 1, the computer component is a keyboard 72. The cover member, when covering the computer component has a top panel 76 a bottom panel 78 and a plurality of side panels 82. Each panel of the cover member has a common and discontinous rear end edge that defines a slit 30. The slit of this cover member is identical to the slit shown in FIG. 3. The cover member is positioned around the computer component and allows the rear edge to frame the computer component when a draw string 38, of the rear end edge, is pulled tight and tied.

The present invention dust cover for computer components is a soft computer cover that protects computer monitors and other components. The present invention will stay in place around the computer component at all times when the user is operating the computer component. The dust cover is made from a cotton-lycra blend fabric that features four way stretch. The present invention dust cover when used on a computer monitor has an open bottom and back with a draw string closure that allow it to be easily pulled over the computer component. When the computer component is used on a monitor, the opening that is defined by the continous front edge, frames the screen of the computer monitor. The dust cover of the present invention that is used for the computer monitor includes a ventilation flap that has pile-type fasteners used as a closing means.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved dust cover for computer components such as a monitor and remaining positioned around the monitor when in use comprising in combination:

a generally rectangular cover member adapted for being supported around a computer component, the cover member being formed of a stretch material capable of being expanded to cover at least four panels of the computer component, the cover member when covering the computer component having a top panel, a bottom panel, and a pair of side panels, each panel of the cover member having a common and continuous front end edge that defines an opening, each panel of the cover member having a common and discontinuous rear end edge, the rear end edge defining a slit within the bottom panel of the cover member, the front end edge and the rear end edge each having a hem, the hem of the front end edge having a semi-rigid framing member therein, the hem of the rear end edge having a draw string therein, the cover member being positioned around the computer component allows the front end edge to frame a screen of the computer component and the slit of the bottom panel to be positioned around a pedestal of the computer component, the cover member being positioned around the computer component allows the rear end edge to frame a back of the computer component when the draw string is pulled tight and tied and the front end edge is framing the screen; and the top panel having a generally rectangular ventilation opening therethrough, the ventilation opening having peripheral edges forming a front edge, a back edge and a pair of side edges, the top panel having a flap fixedly attached to the back edge of the ventilation opening, the flap being sized for covering the ventilation opening, the flap capable of rolling back and forth over the ventilation opening to open and close the ventilation opening when the cover member is positioned over the computer component.

2. A dust cover for computer components comprising:

a cover member adapted for being supported around computer component, the cover member being formed of a stretch material capable of being expanded to cover at least four panels of the computer component, the cover member when covering the computer component having a top panel, a bottom panel, and a pair of side panels, each panel of the cover member having a common and continuous front end edge, each panel of the cover member having a common and discontinuous rear end edge, one of the side panels having a pair of hook and pile fastener strips fixedly attached and spaced apart in a parallel orientation;

a generally rectangular side pocket having a pair of hook and pile fastener strips for coupling with the hook and pile fastener strips of the cover member;

the top panel having a generally rectangular ventilation opening therethrough, the ventilation opening having peripheral edges forming a front edge and a back edge, the top panel having a flap fixedly attached to the back edge of the ventilation opening, the flap being sized for covering the ventilation opening, the flap capable of rolling back and forth over the ventilation opening; and the rear end edge defining a slit within the bottom panel of the cover member, the front end edge and the rear end edge each having a hem, the hem of the front end edge having a semi-rigid framing member therein, the hem of the rear end edge having a draw string therein, the cover member adapted to be positioned around the computer component such that it allows the front end edge to frame a screen of the computer component and the slit of the bottom panel adapted to be positioned around a pedestal of the computer component.

* * * * *